US007147136B2

(12) United States Patent
Burmester et al.
(10) Patent No.: US 7,147,136 B2
(45) Date of Patent: Dec. 12, 2006

(54) DEVICE FOR APPLYING FREE-FLOWING MATERIAL TO A SUBSTRATE MOVEABLE WITH RESPECT THERETO

(75) Inventors: Thomas Burmester, Bleckede (DE); Kai Luebbecke, Wittorf (DE)

(73) Assignee: Nordson Corporation, Westlake, OH (US)

( * ) Notice: Subject to any disclaimer, the term of this patent is extended or adjusted under 35 U.S.C. 154(b) by 177 days.

(21) Appl. No.: 10/485,657

(22) PCT Filed: Aug. 5, 2002

(86) PCT No.: PCT/EP02/08728

§ 371 (c)(1),
(2), (4) Date: Aug. 30, 2004

(87) PCT Pub. No.: WO03/015934

PCT Pub. Date: Feb. 27, 2003

(65) Prior Publication Data

US 2005/0034657 A1 Feb. 17, 2005

(30) Foreign Application Priority Data

Aug. 3, 2001 (DE) ........................... 201 12 891 U

(51) Int. Cl.
*G01F 11/00* (2006.01)

(52) U.S. Cl. ....................... 222/333; 222/389; 222/504

(58) Field of Classification Search ................ 222/333, 222/389, 504

See application file for complete search history.

(56) References Cited

U.S. PATENT DOCUMENTS 3,385,474 A * 5/1968 Roby, Jr. ..................... 222/57
3,459,340 A 8/1969 Smith ......................... 222/380
4,678,100 A * 7/1987 Gelinas et al. ................ 222/52
5,065,910 A 11/1991 Fiedler ....................... 222/504
5,765,729 A * 6/1998 Miller et al. ................ 222/380
5,769,136 A * 6/1998 Kanematsu et al. ........ 141/129
6,056,155 A 5/2000 Byerly et al. .................. 222/1
2002/0139818 A1* 10/2002 McGuffey ................... 222/571

FOREIGN PATENT DOCUMENTS

EP 1147820 10/2001

* cited by examiner

*Primary Examiner*—Joseph A. Kaufman
(74) *Attorney, Agent, or Firm*—Wood, Herron & Evans, L.L.P.

(57) ABSTRACT

A device for dispensing fluid material onto a substrate including a base body with a flow channel for receiving the fluid material and a movable valve body positioned in the flow channel. The valve body is movable in a downstream direction into an open position to release a flow of the fluid material into the flow channel and is movable in an upstream direction into a closed position to interrupt the flow of the fluid material into the flow channel. A drive device moves the valve body between the open position and the closed position. A cylindrical chamber is positioned in the flow channel and the valve body includes a piston movable within the cylindrical chamber. The piston is sealed within the cylindrical chamber in such a way that when the piston moves in a first direction within the cylindrical chamber, the fluid material is displaced from the flow channel and when the piston is moved in a second direction opposite to the first direction, the fluid material is drawn into the flow channel.

10 Claims, 4 Drawing Sheets

DEVICE FOR APPLYING FREE-FLOWING MATERIAL TO A SUBSTRATE MOVEABLE WITH RESPECT THERETO

FIELD OF THE INVENTION

The present invention relates to a device for dispensing fluid material onto a substrate that is movable relative to the device. More specifically, the invention relates to dispensing devices used for intermittent application of liquids such as hot melt adhesive.

BACKGROUND OF THE INVENTION

Dispensing devices such as application heads, are utilized in industry, for example, in order to coat areas of film or foil substrates with liquid adhesive such as hot melt adhesive. The fluid material flows out of a source of material, normally a reservoir, into the flow channel of the device, passes through a valve body, and continues to flow to a nozzle arrangement with an outlet opening. Frequently a so-called intermittent application is performed, meaning that intervals in which the valve body is in the open position and material is applied to the substrate alternate with intervals in which the valve body is in the closed position, so that the application of material is interrupted. Often, very short intervals are used in intermittent applications in order to realize application zones at very small distances from each other.

The application pattern that is produced on the substrate is normally subject to the requirement that a material application zone on the substrate have sharply delimited edges. In the case of a large-area application with the help of a known slit nozzle arrangement, it is especially desired that not only the lateral edges (in the direction of motion of the substrate relative to the application device) but also the front and rear edges of a material application zone be sharply delimited. A prerequisite for such sharp delimitation of the front and rear edges is that the valve body of the valve arrangement is moved quickly into its closed position, so that the flow of material from the outlet opening is interrupted uniformly quickly. When the valve arrangement is opened, in order to attain a sharp boundary line at the front edge of a material application zone it is necessary for the valve arrangement to open quickly and for the application of material to begin without delay.

A needle valve has been used for this purpose, having a needle with a needle tip as a valve body, which may be brought into contact with a valve seat that conforms to the shape of the needle tip. To close the valve arrangement, the needle (under electro-pneumatic actuation) is moved in the direction of the valve seat and comes into contact with the latter, so that the flow cross section of the flow channel is closed and the flow of material is thereby interrupted. During the closing motion of the needle tip, some adhesive is moved downstream by the needle tip in the direction of the outlet opening. As a result, the application of material to the substrate is not interrupted as abruptly as would be necessary to produce a sharp boundary line in the end area of an application zone. An "afterdrip" from the outlet opening during closure of the valve arrangement cannot be prevented.

A reduction of such an afterdrip of material from the outlet opening was achieved by an application head known from the published patent EP-A-0 850 697, in which a valve body that is enlarged compared to a valve shaft is moved upstream to close the valve arrangement, i.e., counter to the direction of flow of the material in the open position in the direction of the outlet opening of a nozzle arrangement. The result of this arrangement is that during the closing motion of the valve body, because of adhesion of the material to the enlarged valve body, and because of material being drawn along, there is a slight backflow of material upstream. A relatively abrupt interruption of the flow of material from the outlet opening results and it is largely possible to prevent afterdripping.

The object of the present invention is to further improve intermittent dispensing devices such that the flow of material out of an outlet opening is interrupted more abruptly, and in particular afterdripping may be prevented even more effectively resulting in very sharply delimited material application zones or application patterns on a substrate.

SUMMARY OF THE INVENTION

The present invention provides a device for dispensing fluid material onto a substrate. The device includes a base body including a flow channel for receiving the fluid material and a movable valve body positioned in the flow channel. The valve body is movable in a downstream direction into an open position to release a flow of the fluid material into the flow channel and is movable in an upstream direction into a closed position to interrupt the flow of the fluid material into the flow channel. A drive device moves the valve body between the open position and the closed position. A cylindrical chamber is positioned in the flow channel and the valve body includes a piston movable within the cylindrical chamber. The piston is sealed within the cylindrical chamber in such a way that when the piston moves in a first direction within the cylindrical chamber, the fluid material is displaced from the flow channel and when the piston is moved in a second direction opposite to the first direction, the fluid material is drawn into the flow channel.

In other aspects of the invention, the piston is positioned downstream from the cylindrical chamber in the open position and is positioned in the cylindrical chamber in the closed position. The movement of the piston from the open position to the closed position draws the fluid material into the flow channel. A valve seat engages with a portion of the valve body positioned upstream from the piston when the valve body is in the closed position. The valve body further comprises a guide section spaced from the piston and the flow channel includes guide surfaces. The guide section contacts the guide surfaces for guiding the valve body laterally as the valve body moves between the open and closed positions. The guide section further comprises a triangular cross section, and the guide surfaces further comprise portions of a cylinder. A tapered section on the valve body is positioned downstream from the piston. The cylindrical chamber and the guide surfaces are formed in a sleeve. The drive device further comprises a second piston coupled to the valve body and operative to move the valve body between the open and closed positions.

Various additional aspects will become more readily apparent by reviewing the following detailed description of the preferred embodiments.

BRIEF DESCRIPTION OF THE DRAWINGS

The present invention will be described below on the basis of a number of exemplary embodiments of the device according to the invention for area application of fluid adhesive to a substrate (application head), with reference to the accompanying drawing.

DETAILED DESCRIPTION

Figure 1:
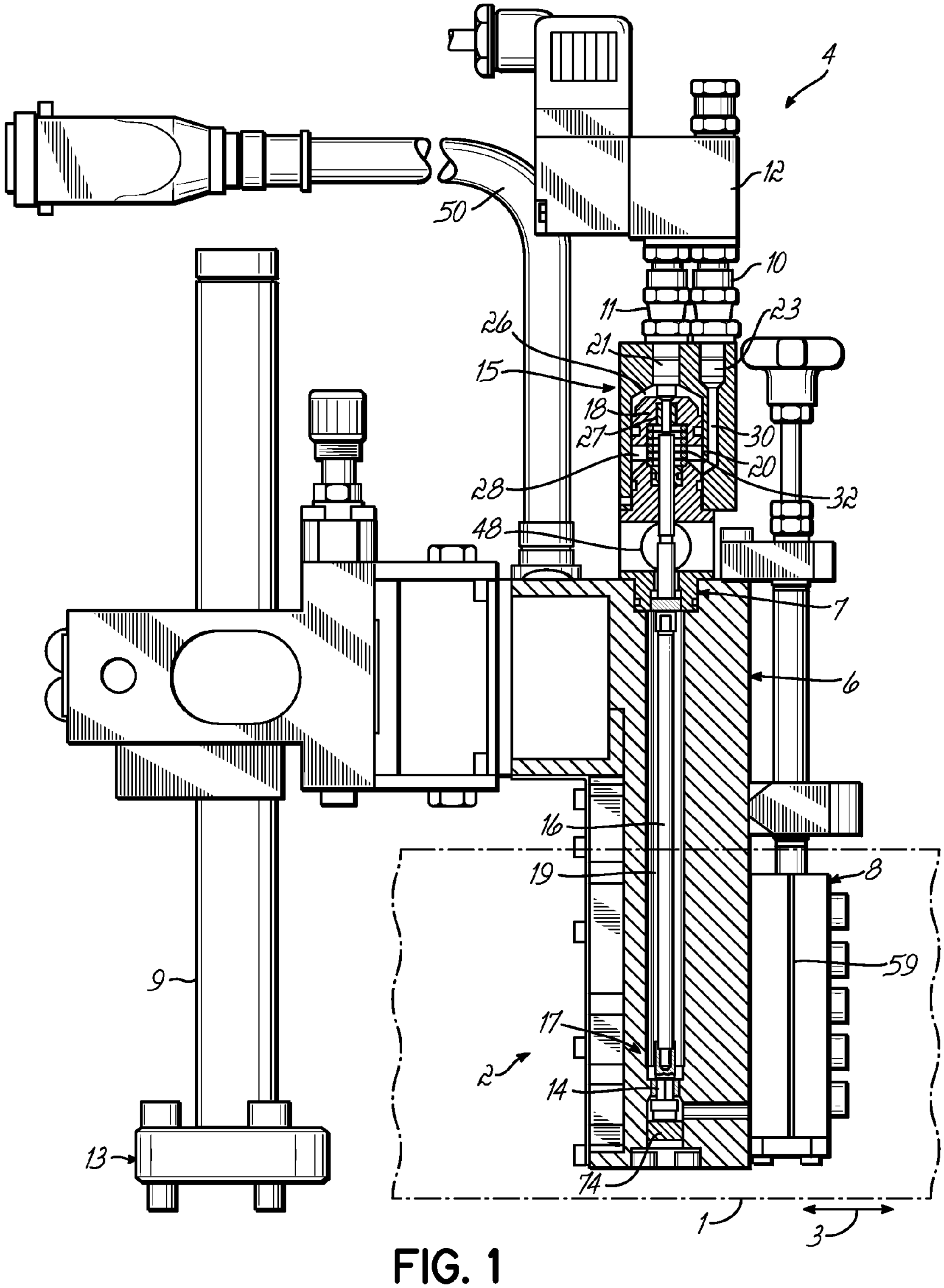
FIG. 1 shows a device according to the present invention for applying liquid adhesive to a substrate with an application head, in partial cutaway view.

The device 2 depicted in FIG. 1, also referred to as application head 2, is used to apply liquid adhesive or other fluid materials to a substrate 1 that is movable relative to device 2 in the direction of arrow 3. Application head 2 includes an electro-pneumatically actuatable control part 4 connected with a base body 6. Base body 6 has a hole 7 into which a lower section of control part 4 is inserted. A nozzle arrangement 8 is removably attached on one side of base body 6 by a threaded connection. Base body 6, and thus application head 2, is mounted on a stationary carrier 13 by a bar 9, and may be shifted in the longitudinal direction of the bar 9 and fixed in various positions.

Control part 4 is connected by means of two pressurized air lines 10, 11 to a pressurized air source, not shown, which supplies a pressure of about 6 bar. With the help of an electrically actuatable solenoid valve 12, pressurized air can be applied to control part 4. In the upper area of control part 4 are two bores 21, 23, which may optionally be connected with a pressurized air line by appropriate switching of solenoid valve 12. Control part 4 includes a drive device 15, described in greater detail below, for moving a valve body 14 of a valve arrangement 17 in order to optionally interrupt or release the flow of the fluid material in a flow channel 19 which is formed in base body 6.

Figure 2:
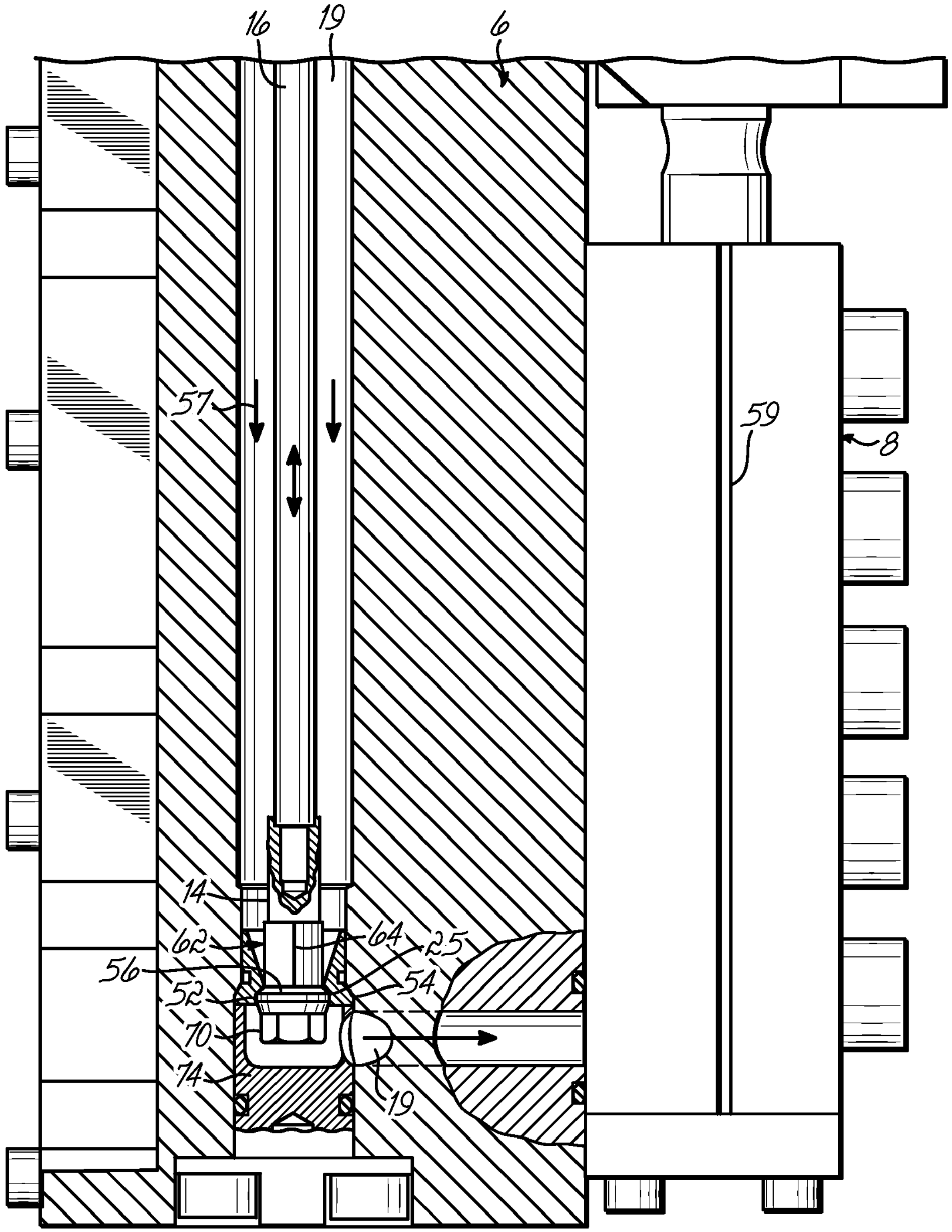
FIG. 2 shows a lower section of the device according to FIG. 1 in a sectional view.

The valve arrangement 17, shown enlarged in FIG. 2, has the movable valve body 14 positioned in the flow-channel 19, a bar-shaped, axially movable valve shaft 16 connected with it by a threaded connection, and a valve seat which is part of flow channel 19. The movable valve body 14 interacts with valve seat 25 in such a way that the flow of material is entirely interrupted by moving valve body 14 upstream into a closed position and is released by moving it downstream into an open position.

As FIG. 1 shows, drive device 15 for moving valve shaft 16 and valve body 14 has a pressurized air piston 18 which is connected to the upper end of movable valve shaft 16. Piston 18 is positioned in a bore 20 formed in control part 4 and is axially movable. Piston 18 has a central bore 27, in which an end section of valve shaft 16 is positioned. A screw is screwed into female threading at the end of valve shaft 16, securing piston 18 to valve shaft 16.

Above piston 18 is a chamber 26 that may be filled with gas. It is chargeable with pressurized gas through bore 21. This makes it possible to apply a force to piston 18. Below piston 18 is another chamber 28 in bore 20 that may be filled with gas. It is chargeable with pressurized gas through line 10, bore 23 and channel 30. Piston 18 may be pressed downward in FIG. 1, downstream in the direction of nozzle arrangement 8, so that valve body 14 is moved into its open position. Piston 18 is sealed against a wall of bore 20 with O-rings in a manner not described in further detail. A spiral spring 32 is positioned in chamber 28 concentric to the essentially cylindrical valve shaft 16. The force of spring 32 operates on piston 18 and pre-stresses it upward, as viewed in FIG. 1, into the closed position of valve body 14 of valve arrangement 17.

To open valve arrangement 17 and thus release the flow of adhesive, solenoid valve 12 is actuated. This causes a pressure that corresponds approximately to the pressurized air source to be produced in chamber 26 and to operate on piston 18. To close valve arrangement 17 and thus interrupt the flow of adhesive, solenoid valve 12 is switched so that the pressure in chamber 26 is reduced. To this end, pressurized air is discharged from solenoid valve 12 into the environment. Through this reduction in pressure in chamber 26 piston 18 is pressed "upward," and valve body 14 is moved into the closed position. The spring force of spring 32 operates supportively.

Feeding adhesive to nozzle arrangement 8, from which the adhesive is dispensed and applied to substrate 1, is the function of adhesive flow channel 19 formed in base body 6. Flow channel 19 can be supplied with adhesive from a source of adhesive via a cylindrical bore 48 in base body 6. Bore 48 communicates with a tube 50.

Figure 3:
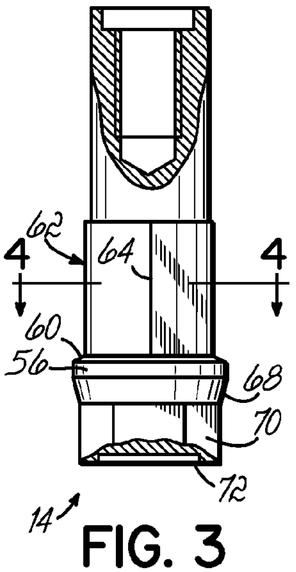
FIG. 3 shows a valve body according to the present invention with a piston section, in partial cutaway view.

As illustrated in FIG. 2 and 3, in the lower section of flow channel 19 there is a cylindrical chamber 52 formed by a cylindrical section of a sleeve 54, which is inserted firmly but removably into base body 6. FIGS. 5 through 8 also illustrate cylindrical chamber 52. On valve body 14 there is a piston section 56 that cooperates with cylindrical chamber 52. Piston section 56 has an essentially cylindrical peripheral surface, as may be seen clearly from the representation of valve body 14 in FIG. 3. Piston section 56 is dimensioned so that it is movable axially in and out of cylindrical chamber 52 of flow channel 19 with close tolerance, and in so doing is sealed within cylindrical chamber 52 in such a way that when piston section 56 is moved fluid material in flow channel 19 is displaced and/or drawn in. Because of the relatively tight fit between the cylindrical peripheral surface of piston section 56 and the inner surface of cylindrical chamber 52, which is delimited by a section 58 of sleeve 54 having a cylindrical inner surface, fluid material is positively displaced or drawn in in a defined manner. At the same time, the result is that when piston section 56 plunges into cylindrical chamber 52 the flow of material downstream in flow channel 19, i.e., in the direction of arrows 57 in FIG. 2, is already interrupted.

Figure 6:
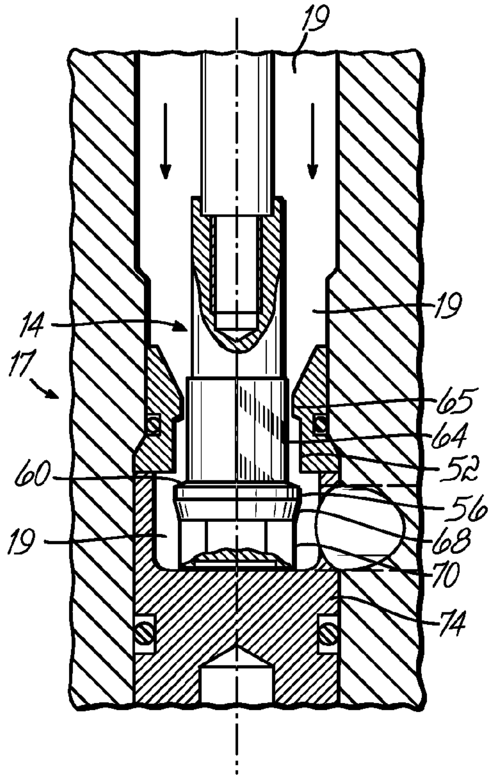
FIG. 6 shows a sectional view of the device according to the present invention with the valve body in the open position.
Figure 7:
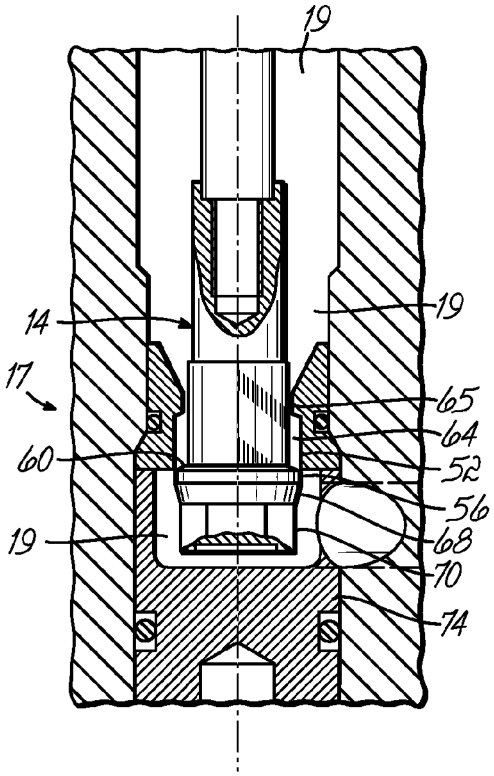
FIG. 7 shows a sectional view of the device according to the present invention while the valve body is moving upstream.

As FIG. 6 shows, when valve arrangement 17 is open, piston section 56 is positioned downstream (see arrows 57) from cylindrical chamber 52, and by movement upstream (counter to the direction of arrow 57) may be moved upstream into cylindrical chamber 52. FIG. 2 and FIGS. 6 through 8 illustrate the movement of valve body 14 with piston section 56 upstream (upward) whereby piston section 56 plunges into cylindrical chamber 52 (FIG. 7). In the position of valve body 14 shown in FIG. 7, the downstream flow of material in flow channel 19 is first interrupted. Moving valve body and piston section 56 further upstream (upward) results in a displacement of the fluid material above piston section 56, due to the seal of piston section 56 against the inner surface of cylindrical chamber 52. At the same time, in the area downstream from piston section 56 in the lower section of flow channel 19, fluid material is drawn in and transported upstream. This effectively prevents after-dripping in the area of the slit-shaped outlet opening 59 of the nozzle arrangement, which communicates with flow channel 19.

Figure 5:
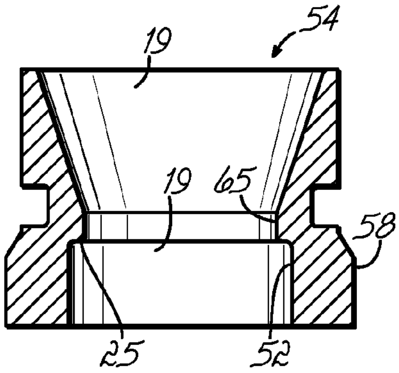
FIG. 5 shows a sleeve that has the cylindrical section in a sectional view.
Figure 8:
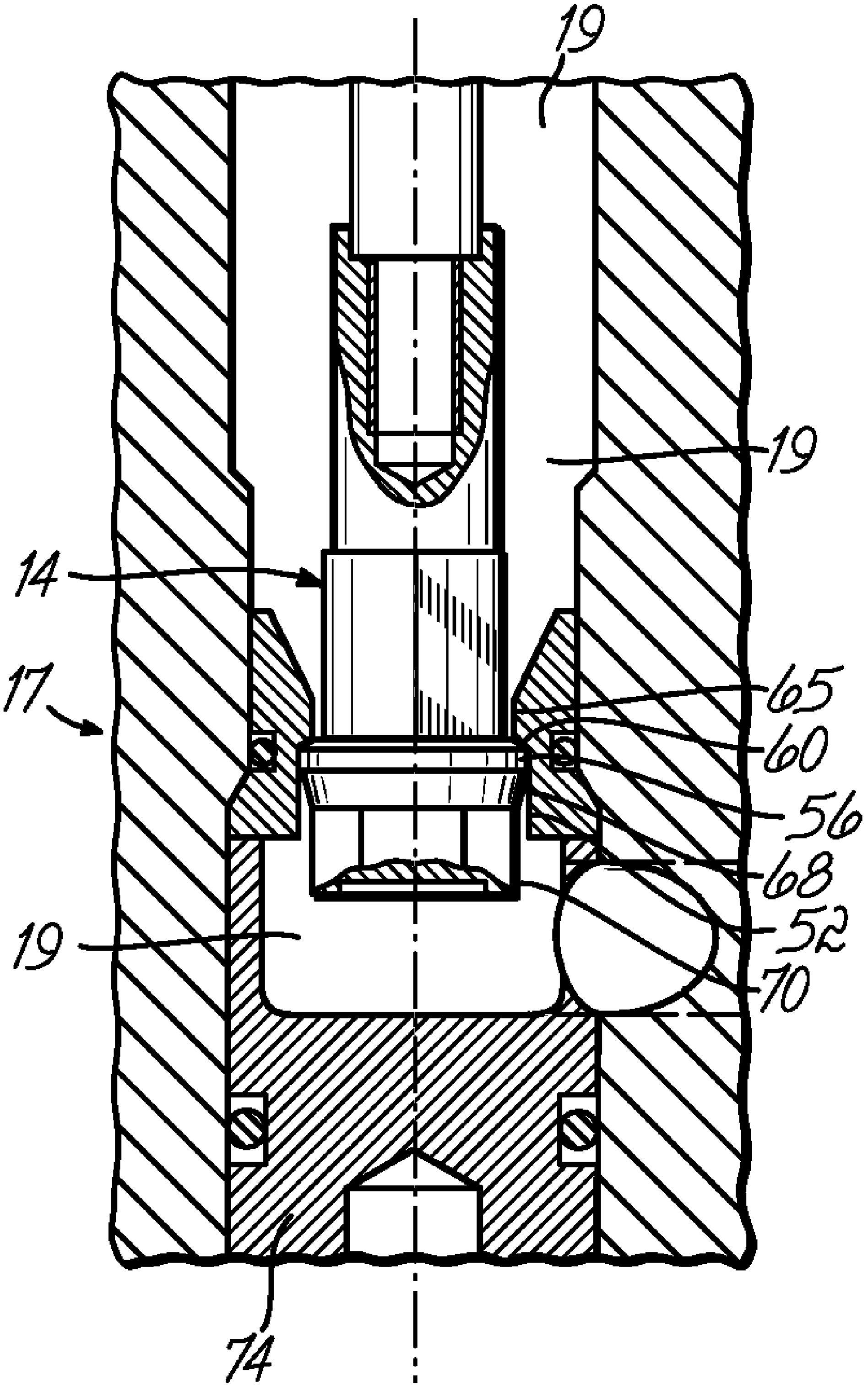
FIG. 8 shows a sectional view of the device according to the present invention with the valve body in the fully closed position.

In the closed position of valve body 14 shown in FIG. 8, a ring-shaped contact surface 60 formed on a conical section adjacent to piston section 56 (see also FIG. 3) is in contact with the valve seat 25 formed on sleeve 54 (see also FIG. 5).

Figure 4:
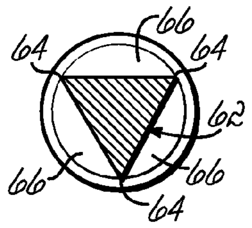
FIG. 4 shows a sectional view along section A—A according to FIG. 3.

As illustrated in FIGS. 2, 3 and 4, valve body 14 has a guide section 62 adjacent to the conical section to guide valve body 14 laterally. Guide section 62 provides for axial guidance, and has three guide surfaces 64 (see FIG. 3) in contact with an opposing guide surface 65 on sleeve 54 (FIG. 5). Guide surfaces 64 of guide section 62 are located in the outer edge areas of guide section 62 and have a curved, cylindrical shape, so that they are matched to the cylindrical guide surface 65. Guide section 62 has a triangular cross section. Thus, there are three like-shaped flow cross sections 66 in the form of circle segments (FIG. 4) between guide section 62 and the inner surface of sleeve 54, in particular in the area of guide surfaces 65. These three flow cross sections 66 are part of flow channel 19. Alternatively, guide section 62 could be made with a square cross section or could have axial grooves.

As FIGS. 2 and 3 show, downstream (below piston section 56) there is first a conically tapering section 68, followed by a square section 70 which is tapered compared to piston section 56. Lower ring surface 72 of square section 70 forms a contact surface that rests on an insert 74 inserted into base body 6. Insert 74 delimits flow channel 19 at the bottom when the valve body is in the fully open position (FIG. 6).

The invention claimed is:

1. A device for dispensing fluid material onto a substrate, comprising:
- a base body including a flow channel for receiving the fluid material,
- a movable valve body positioned in said flow channel, said valve body movable in a downstream direction into an open position to release a flow of the fluid material into said flow channel, and movable in an upstream direction into a closed position to interrupt the flow of the fluid material into said flow channel,
- a drive device configured to move said valve body between the open position and the closed position,
- a cylindrical chamber in said flow channel, said valve body including a piston movable within said cylindrical chamber, said piston configured for movement in at least the upstream direction after being sealed within said cylindrical chamber so that when said piston moves in a first direction within said cylindrical chamber, the fluid material is displaced from said flow channel and when said piston is moved in a second direction opposite to said first direction, the fluid material is drawn into said flow channel.

2. The device of claim 1, wherein said piston is positioned downstream from said cylindrical chamber in the open position and is positioned in said cylindrical chamber in the closed position, and the movement of the piston from the open position to the closed position draws the fluid material into said flow channel.

3. The device of claim 1, further comprising a valve seat configured to engage with a portion of said valve body positioned upstream from said piston when said valve body is in the closed position.

4. The device of claim 1, wherein said valve body further comprises a guide section spaced from said piston and said flow channel includes guide surfaces, said guide section contacting said guide surfaces for guiding said valve body laterally as said valve body moves between the open and closed positions.

5. The device of claim 4, wherein said guide section further comprises a triangular cross section, and said guide surfaces further comprise portions of a cylinder.

6. The device of claim 1, further comprising a tapered section on said valve body positioned downstream from said piston.

7. The device of claim 1, further comprising a sleeve, said cylindrical chamber and said guide surfaces being formed in said sleeve.

8. The device of claim 1, wherein said drive device further comprises a second piston coupled to said valve body and operative to move said valve body between the open and closed positions.

9. A device for dispensing fluid material onto a substrate, comprising:
- a base body including a flow channel for receiving the fluid material,
- a movable valve body positioned in said flow channel, said valve body movable in a downstream direction into an open position to release a flow of the fluid material into said flow channel, and movable in an upstream direction into a closed position to interrupt the flow of the fluid material into said flow channel,
- a drive device configured to move said valve body between the open position and the closed position, and
- a cylindrical chamber in said flow channel, said valve body comprising:
  - a piston movable within said cylindrical chamber, said piston sealed within said cylindrical chamber in such a way that when said piston moves in a first direction within said cylindrical chamber, the fluid material is displaced from said flow channel and when said piston is moved in a second direction opposite to said first direction, the fluid material is drawn into said flow channel,
  - a guide section spaced from said piston and having a triangular cross section, and
  - guide surfaces in said flow channel configured as portions of a cylinder, said guide section contacting said guide surfaces for guiding said valve body laterally as said valve body moves between the open and closed positions.

10. A device for dispensing fluid material onto a substrate, comprising:
- a base body including a flow channel for receiving the fluid material,
- a movable valve body positioned in said flow channel, said valve body movable in a downstream direction into an open position to release a flow of the fluid material into said flow channel, and movable in an upstream direction into a closed position to interrupt the flow of the fluid material into said flow channel,
- a drive device configured to move said valve body between the open position and the closed position,
- a portion of said flow channel defining a cylindrical chamber defined by a wall and a valve seat positioned upstream from said cylindrical chamber,
- said valve body including a piston section movable within said cylindrical chamber and adapted to seal with said wall, and a contact surface positioned upstream of said piston section and adapted to engage with said valve seat, wherein said piston section seals with said wall of said cylindrical chamber before said contact surface engages said valve seat as the valve body is moved in the upstream direction and into the closed position, the fluid material being drawn into said flow channel when the valve body is moved in the upstream direction.

* * * * *